Patented Oct. 3, 1950

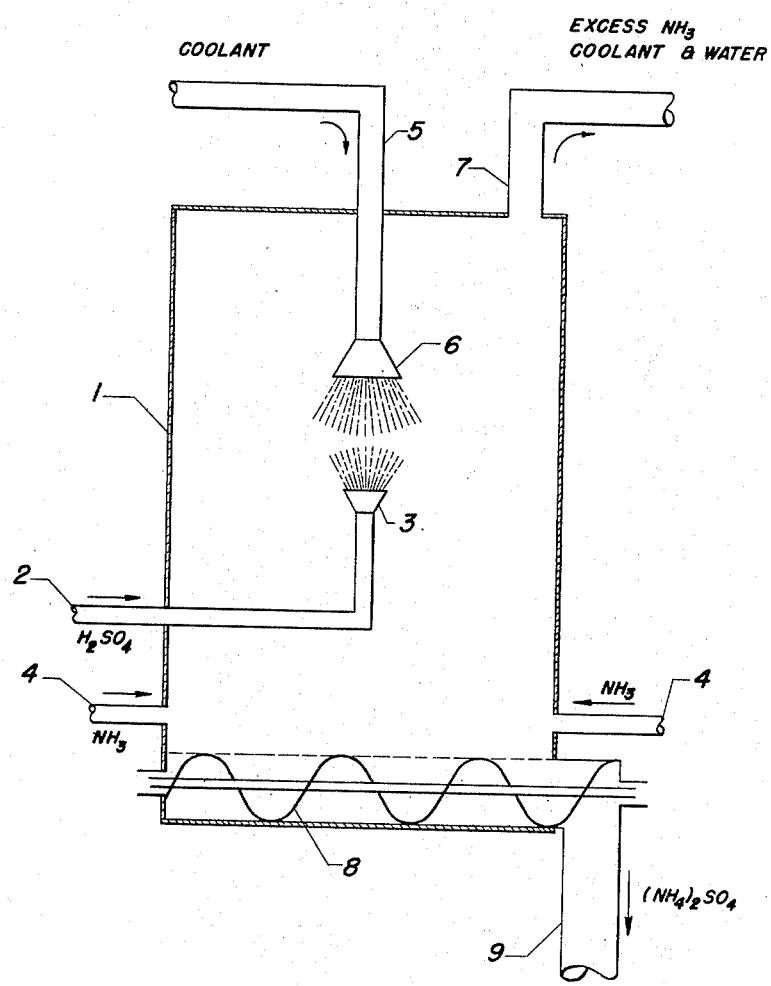

2,524,341

UNITED STATES PATENT OFFICE 2,524,341

AMMONIUM SULFATE PRODUCTION

Harold D. Chapman and William I. Denton, Woodbury, and Richard B. Bishop, Haddonfield, N. J., assignors to Socony-Vacuum Oil Company, Incorporated, a corporation of New York Application September 10, 1948, Serial No. 48,746

6 Claims. (Cl. 23—119)

This invention has to do with a new and novel process for the manufacture of chemicals which are obtained in the form of dry solids, or high boiling liquids.

In the chemical art, a great many processes have been proposed for the preparation of solids and high boiling liquids. Typical of such processes are those which have been resorted to for the preparation of ammonium sulfate. In general, most prior processes involve reaction of ammonia with sulfuric acid whereupon an ammonium sulfate solution is formed. The reaction is characterized by a large evolution of heat and cooling is essential. One such process then requires that the ammonium sulfate solution be concentrated until a saturated or super-saturated solution is obtained, the latter solution being cooled in a crystallizer whereupon ammonium sulfate crystals are formed. Thereafter, the crystals are dried in a centrifuge operation. This prior process has been of some value, yet several characterizing features limit its utility. For example, considerable heat is required in order to concentrate the initial ammonium sulfate solution, and the crystallizers required are large, relatively expensive and cumbersome, requiring close control for proper crystal formation. Further, it is difficult to obtain a completely dry product in a centrifuge operation. There is also the additional disadvantage in the necessity of recycling the solution from which the ammonium sulfate crystals have been separated; this solution is commonly referred to as the "mother liquor."

A second process previously proposed also involves reaction of ammonia and sulfuric acid, with the formation of an ammonium sulfate solution. Here, water in the solution is evaporated and the resulting anhydrous ammonium sulfate solution is sprayed into a large tower, generally thirty feet or more in diameter, with air blown therethrough to cool and solidify the liquid into solid ammonium sulfate. The latter must then be separated from the air. In this process difficulty is encountered in the evaporation procedure, inasmuch as the ammonium sulfate tends to form a layer upon the evaporator, thereby reducing heat transfer. In addition to heat required in the evaporator, heat is required to solidify the product. The latter operation involves heating large amounts of air. Obviously, equipment used in this process is large and represents a considerable initial investment.

In a third process wherein an ammonium sulfate solution is formed, ammonium sulfate is crystallized on a series of trays and separated from the mother liquor by filtration. This is a slow and tedious operation, requiring a large working area and considerable manual handling of products.

Essentially, all prior processes wherein an ammonium sulfate solution is formed required that heat be removed in the reaction procedure and that heat be applied in the concentrating and drying operations. In addition, equipment required is large and expensive, particularly so because corrosion resistant materials must be used in view of the dilute sulfuric acid in contact therewith.

The foregoing shortcomings of early processes have been recognized for some time, with several procedures developed subsequently to avoid the various undesirable features. One such procedure, described in U. S. Patent No. 1,962,185, comprises spraying sulfuric acid through an atomizer into an atmosphere of ammonia. Heat developed in the reaction is controlled, by using a dilute sulfuric acid, for example, about 62 per cent acid, and evaporating the water therein. Water evaporates from the reaction area, thus providing a means for controlling the temperature. In this procedure, should acids of greater concentration than about 62 per cent be used, the amount of cooling provided by evaporation of the water would be insufficient, the temperature would rise such that ammonium sulfate would melt and solidfy. Should more dilute acid solutions be used, sufficient heat would not be available to remove water and a wet product would be obtained. In this procedure, heat control is inefficient and some ammonium sulfate is melted as soon as it is formed. When the melted and resolidified ammonium sulfate crystals mix with more ammonium sulfate crystals, the product is not "free-flowing."

A procedure similar to that of U. S. Patent No. 1,962,185 is described by Hirschkind et al. in U. S. Patent No. 1,971,563. Heat is controlled in the latter procedure by regulating the amount of water in the acid, or by regulating dilution of acid with water. This procedure suffers from the same disadvantages as those recited above in connection with 1,962,185. Heat control is particularly poor when concentrated (80% or higher) acid is used since in order to use this concentration of acid it is necesary to dilute it to about 62%. The large amount of heat evolved and the hazards of diluting concentrated sulfuric acid with water are well known to any chemist who has tried the operation. Another process of this type is shown by Curtis, in U. S. Patent No. 2,051,029, sulfuric acid being sprayed into the top of a tall reaction tower wherein it contacts a rising flow of ammonia, introduced at an intermediate portion of the tower. An inert gas, such as air, is introduced with the ammonia and may also be introduced with the acid, thus serving as a means for removing heat of reaction. The inert gas, however, cannot absorb sufficient heat to provide temperature control, unless excessively large quantities are used. In general, then, prior processes are characterized by relatively inefficient heat control, particularly when concentrated acids are used.

It has now been discovered that a free-flowing ammonium sulfate of excellent quality can be prepared by a new and novel means of controlling the reaction of ammonia and sulfuric acid. In the process of this invention, a liquid coolant which boils at or below the lower end of the reaction temperature range, is brought into contact with the ammonium sulfate as soon as it is formed, thereby absorbing the heat of reaction. In this way, there is no opportunity for the ammonium sulfate to melt and re-solidify, this being one interfering factor in the preparation of a free-flowing product. In addition, the liquid coolant comes into contact with the product rather than with sulfuric acid per se, thus avoiding any heat evolution which might result in the latter instance and avoiding any reaction between the coolant and acid. Coupled with the foregoing feature of so controlling heat in the process is the regulation of acid concentration. In this process, the sulfuric acid is one within the range of about 80 per cent to about 100 per cent.

As indicated above, liquid coolants used in the present process are stable under the conditions of reaction, and boil at temperatures at or below the lower end of the reaction temperature range. The latter range is one from about 220° F. to about 330° F., and is preferably from about 250° F. to about 300° F. Coolants suitable for use in the process, therefore, include water, liquid ammonia, toluene, butane, hydrocarbon fractions such as petroleum ether, etc. It will be understood that combinations of such coolants may be used. Toluene has been found to be excellently suited for the present process. For example, toluene is more advantageous in the process, when compared with water, the latter giving rise to corrosion problems when corrosion-susceptible materials are used.

The amount of coolant used is controlled by the amount of heat liberated through reaction of ammonia and sulfuric acid with the formation of ammonium sulfate, which heat is to be removed from the reaction vessel. The quantity of coolant is adjusted to maintain the reaction temperature within the range of about 220° F. to about 330° F. Such quantities are indicated by those used in the illustrative examples provided below.

Reaction of ammonia and sulfuric acid is carried out with an excess of ammonia. Preferably, from about 1.0 mol to about 2 mols of ammonia are used for each mol of sulfuric acid. Pressure is not critical in the reaction and may be either atmospheric, sub- or super-atmospheric. Similarly, time does not appear to be critical.

Reference is now made to the drawing in order to illustrate the process of this invention. In the drawing, Figure I is a diagrammatic vertical section of one form of apparatus which may be used to effect the reaction. Reactor 1 is equipped with inlet 2 through which sulfuric acid is introduced, acid entering the reactor through atomizer 3. It will be recognized that the flow of acid through inlet 2 and atomizer 3 may be regulated by the size of the atomizer and by the pressure applied to the acid reservoir (not shown). Also, acid may be preheated to a suitable temperature prior to entry to the reactor; such preheating may be accomplished by locating a preheater (not shown) in inlet 2. Ammonia is introduced into the reactor tangentially to the reactor wall, through inlets 4 and 4', positioned at the lower portion of the reactor, thus providing an atmosphere of ammonia throughout the major portion of the reactor. In this way, a curtain of ammonia is maintained about the inner reactor wall and prevents any acid spray from reaching the wall. To further ensure that acid spray does not contact the reactor wall, the diameter of the reactor is of sufficient size. Inlets 4 and 4' will contain therein suitable metering means, as a rotameter (not shown), and may have located therein preheaters (not shown). The velocity of ammonia flow up through the reactor is maintained at a sufficiently low rate that the ammonium sulfate crystals formed fall to the bottom of the reactor. Coolant, such as toluene, enters the reactor through inlet 5, emerging through atomizer 6. For most efficient operation, atomizers 3 and 6 are opposed to each other, as shown, in order to provide effective contact of coolant with ammonium sulfate as it forms above and about atomizer 3. Here, too, the flow of coolant may be regulated by the size of the atomizer 6 and by the pressure applied to the coolant reservoir (not shown); this flow, in turn, is adjusted by the rise and fall of temperature within the reactor. It will be understood that several such atomizers may be properly disposed in the reactor such that sufficient coolant is provided for controlling heat of reaction.

Excess ammonia, coolant and any water present is carried over from reactor 1 through exit line 7. Ammonium sulfate formed in the reactor is collected on the screw conveyer 8 and is removed through line 9. It will be clear to those familiar with the art that excess ammonia, coolant and any water present in line 7, may be cooled, separated and the coolant and ammonia recycled to the reactor.

In order to further illustrate the efficacy of the present process, the following typical, and non-limiting, examples are provided below.

*Example I*

A charge of 12.5 pounds (0.128 mol) of 80 per cent sulfuric acid was sprayed into a reactor of the type shown in Figure I, during a period of 30 minutes, under a pressure of 100 pounds per square inch (operating pressure of the atomizer used). The atomizer was a 30 degree cone. Eight pounds (0.47 mol) of anhydrous ammonia were metered to the reactor during the same time interval, 30 minutes. Water was used as the coolant, with water and recovered ammonia being sprayed from the top of the reactor through a 60 degree cone-shaped atomizer, at a rate of one gallon per hour. The temperature of the reactor was maintained between 240° F. and 280° F. Water and ammonia recovered at the end of the 30 minute period was 3.3 pounds. The ammonium sulfate formed and removed from the reactor was a dry, white, free-flowing powder.

*Example II*

In this example, the apparatus used was that referred to in Example I above. 12.3 pounds (0.125 mol) of 80 per cent sulfuric acid was sprayed through a 30 degree cone, under a pressure of 100 pounds per square inch, during a period of 41 minutes. The ammonia was preheated to 250° F. and introduced as before. Toluene (coolant) and recovered ammonia were introduced through a 60 degree cone, during the same time interval; the quantity of ammonia introduced was 4.5 pounds (0.26 mol) and the quantity of toluene was 2.75 pounds. Recovered ammonia and recovered toluene were recycled at a rate of 1 gallon per hour. The temperature was maintained between 265-300° F. Ammonium sulfate formed was a white, free-flowing powder.

Although the process of this invention is illustrated hereinabove by the preparation of ammonium sulfate, it is advantageous generally in carrying out exothermic reactions wherein the products are solids or high boiling liquids, with other products of reaction being gaseous under conditions of operation. Neutralization reactions—of an acid and a base, with the formation of a salt—are effectively carried out following this process. So too, limited oxidation reactions of hydrocarbons, as opposed to complete oxidation to carbon and carbon oxides, are other suitable reactions. Typical of such oxidation reactions is the reaction of methyl naphthalene with air to form the corresponding solid naphthoic acid.

We claim:

1. The process for preparing solid, substantially dry and free-flowing ammonium sulfate, which comprises: spraying sulfuric acid having a concentration from about 80 per cent to about 100 per cent, into an atmosphere of ammonia comprising a quantity of ammonia in excess of the stoichiometric quantity for reaction with said acid to form ammonium sulfate, at a temperature between about 220° F. and about 330° F., and spraying on said ammonium sulfate as it forms a liquid coolant having a boiling point not greater than about 240° F., the quantity of said coolant being so regulated as to maintain the temperature between about 220° F. and about 330° F.

2. The process for preparing solid, substantially dry and free-flowing ammonium sulfate, which comprises: spraying sulfuric acid having a concentration from about 80 per cent to about 100 per cent, into an atmosphere of ammonia comprising a quantity of ammonia in excess of the stoichiometric quantity for reaction with said acid to form ammonium sulfate, at a temperature between about 250° F. and about 300° F., and spraying on said ammonium sulfate as it forms a liquid coolant having a boiling point not greater than about 240° F., the quantity of said coolant being so regulated as to maintain the temperature between about 250° F. and about 300° F.

3. The process for preparing solid, substantially dry and free-flowing ammonium sulfate, which comprises: spraying sulfuric acid having a concentration from about 80 per cent to about 100 per cent, into an atmosphere of ammonia comprising a quantity of ammonia in excess of the stoichiometric quantity for reaction with said acid to form ammonium sulfate, at a temperature between about 225° F. and about 330° F., and spraying water on said ammonium sulfate as it forms, the quantity of said water being so regulated as to maintain the temperature between about 225° F. and about 330° F.

4. The process for preparing solid, substantially dry and free-flowing ammonium sulfate, which comprises: spraying sulfuric acid having a concentration from about 80 per cent to about 100 per cent, into an atmosphere of ammonia comprising a quantity of ammonia in excess of the stoichiometric quantity for reaction with said acid to form ammonium sulfate, at a temperature between about 240° F. and about 330° F., and spraying toluene on said ammonium sulfate as it forms, the quantity of said toluene being so regulated as to maintain the temperature between about 240° F. and about 330° F.

5. The process for preparing solid, substantially dry and free-flowing ammonium sulfate, which comprises: spraying sulfuric acid having a concentration of about 80 per cent, into an atmosphere of ammonia comprising a quantity of ammonia in excess of the stoichiometric quantity for reaction with said acid to form ammonium sulfate, at a temperature between about 240° F. and about 280° F., and spraying water on said ammonium sulfate as it forms, the quantity of said water being so regulated as to maintain the temperature between about 240° F. and about 280° F.

6. The process for preparing solid, substantially dry and free-flowing ammonium sulfate, which comprises: spraying sulfuric acid having a concentration of about 80 per cent, into an atmosphere of ammonia comprising a quantity of ammonia in excess of the stoichiometric quantity for reaction with said acid to form ammonium sulfate, at a temperature between about 265° F. and about 300° F., and spraying toluene on said ammonium sulfate as it forms, the quantity of said toluene being so regulated as to maintain the temperature between about 265° F. and about 300° F.

HAROLD D. CHAPMAN.
WILLIAM I. DENTON.
RICHARD B. BISHOP.

REFERENCES CITED

The following references are of record in the file of this patent:

UNITED STATES PATENTS

| Number | Name | Date |
| --- | --- | --- |
| 1,508,736 | West | Sept. 16, 1924 |
| 1,962,185 | Fauser | June 12, 1934 |
| 1,971,563 | Hirschkind et al. | Aug. 28, 1934 |

FOREIGN PATENTS

| Number | Country | Date |
| --- | --- | --- |
| 273,093 | Great Britain | June 30, 1927 |
| 247,227 | Great Britain | Apr. 7, 1927 |